(12) United States Patent
Blot et al.

(10) Patent No.: US 9,597,844 B2
(45) Date of Patent: Mar. 21, 2017

(54) PROCESS FOR MANUFACTURING A TEXTILE PREFORM WITH CONTINUOUS FIBRES BY CIRCULATION OF HOT GAS FLOW THROUGH A FIBROUS ARRAY

(71) Applicant: AIRBUS OPERATIONS (S.A.S.), Toulouse (FR)

(72) Inventors: Philippe Blot, Nantes (FR); Bertrand Duthille, Reze (FR); Serge Boude, Angers (FR); Cédric Pupin, Montreal (CA); Marc Moret, La Chapelle sur Erdre (FR); Clément Jourdren, Le Loroux Bottereau (FR)

(73) Assignee: Airbus Operations (S.A.S.), Toulouse (FR)

( * ) Notice: Subject to any disclaimer, the term of this patent is extended or adjusted under 35 U.S.C. 154(b) by 437 days.

(21) Appl. No.: 14/133,023

(22) Filed: Dec. 18, 2013

(65) Prior Publication Data
US 2015/0367583 A1 Dec. 24, 2015

(30) Foreign Application Priority Data
Dec. 20, 2012 (FR) ...................................... 12 62466

(51) Int. Cl.
*B29C 70/48* (2006.01)
*B29C 70/54* (2006.01)
(Continued)

(52) U.S. Cl.
CPC .............. *B29C 70/48* (2013.01); *B29B 11/16* (2013.01); *B29C 33/046* (2013.01);
(Continued)

(58) Field of Classification Search
CPC ..... B29C 70/48; B29C 70/682; B29C 70/088; B29C 70/541; B29C 33/046;
(Continued)

(56) References Cited

U.S. PATENT DOCUMENTS 2,748,028 A * 5/1956 Richardson ........... C03C 25/326
428/221
3,128,322 A 4/1964 Young
(Continued)

FOREIGN PATENT DOCUMENTS

DE 10 2004 025704 12/2005
DE 10 2004 045398 5/2006
(Continued)

OTHER PUBLICATIONS

French Patent Application 12 57256 dated Jul. 26, 2012.
(Continued)

*Primary Examiner* — Matthew Daniels
(74) *Attorney, Agent, or Firm* — Jenkins, Wilson, Taylor & Hunt, P.A.

(57) ABSTRACT

The invention relates to a process for manufacturing a textile preform from a fibrous array with continuous fibres, the process comprising a step for heating of the fibrous array between a matrix and a punch to stiffen this fibrous array. To cut down processing time, the heating step is performed by having a hot gas flow circulate through the matrix, the fibrous array and the punch.

6 Claims, 5 Drawing Sheets

(51) Int. Cl.
*B29B 11/16* (2006.01)
*B29C 33/04* (2006.01)
*B29C 33/38* (2006.01)
*B29C 35/04* (2006.01)
*B29C 70/08* (2006.01)
*B29C 70/68* (2006.01)
B29C 35/16 (2006.01)
B29K 105/08 (2006.01)
B29K 101/00 (2006.01)
B29K 105/00 (2006.01)
B29K 307/04 (2006.01)
B29L 9/00 (2006.01)

(52) U.S. Cl.
CPC ........ *B29C 33/3814* (2013.01); *B29C 35/045* (2013.01); *B29C 70/081* (2013.01); *B29C 70/088* (2013.01); *B29C 70/541* (2013.01); *B29C 70/682* (2013.01); B29C 2035/1658 (2013.01); B29K 2101/00 (2013.01); B29K 2105/08 (2013.01); B29K 2105/251 (2013.01); B29K 2307/04 (2013.01); B29K 2313/00 (2013.01); B29L 2009/005 (2013.01)

(58) Field of Classification Search
CPC . B29C 35/045; B29C 33/3814; B29C 31/085; B29C 37/0075; B21D 35/003
See application file for complete search history.

(56) References Cited

U.S. PATENT DOCUMENTS

| | | | | |
|---|---|---|---|---|
| 3,205,110 | A * | 9/1965 | Rinderspacher | B29C 51/08 156/224 |
| 3,264,392 | A * | 8/1966 | Taplin | B29C 43/36 223/12 |
| 3,349,153 | A * | 10/1967 | Beck | B21D 22/22 264/292 |
| 4,045,986 | A * | 9/1977 | Laycock | B21D 26/055 72/60 |
| 4,192,638 | A * | 3/1980 | Lezier | B29C 44/3426 249/111 |
| 4,229,497 | A | 10/1980 | Piazza | |
| 4,379,101 | A * | 4/1983 | Smith | B27N 5/00 264/109 |
| 4,609,519 | A * | 9/1986 | Pichard | B29C 33/046 264/112 |
| 4,683,018 | A * | 7/1987 | Sutcliffe | B29C 33/68 156/196 |
| 4,781,569 | A * | 11/1988 | Kinugasa | B29C 33/3814 156/245 |
| 4,943,222 | A * | 7/1990 | Nathoo | B28B 7/12 264/511 |
| 4,946,526 | A | 8/1990 | Petty-Galis | |
| 4,988,469 | A | 1/1991 | Reavely et al. | |
| 5,085,814 | A * | 2/1992 | Kamiyama | B29C 33/3814 264/126 |
| 5,695,848 | A * | 12/1997 | Wilkins | D04H 3/02 428/131 |
| 5,820,801 | A | 10/1998 | Greve | |
| 5,863,452 | A | 1/1999 | Harshberger, Jr. | |
| 5,954,917 | A | 9/1999 | Jackson | |
| 6,257,858 | B1 | 7/2001 | Pabsch | |
| 6,478,913 | B1 * | 11/2002 | Dunleavy | B29C 70/00 156/153 |
| 6,843,953 | B2 | 1/2005 | Filsinger et al. | |
| 7,625,618 | B1 | 12/2009 | Allen | |
| 2002/0178992 | A1 | 12/2002 | Lewit | |
| 2003/0090025 | A1 * | 5/2003 | Nelson | B29C 70/086 264/162 |
| 2004/0000745 | A1 | 1/2004 | Channer | |
| 2004/0222562 | A1 | 11/2004 | Kirchner | |
| 2006/0208135 | A1 | 9/2006 | Liguore et al. | |
| 2008/0116618 | A1 | 5/2008 | Martin | |
| 2008/0290214 | A1 | 11/2008 | Guzman | |
| 2008/0302912 | A1 | 12/2008 | Yip et al. | |
| 2009/0320292 | A1 | 12/2009 | Brennan | |
| 2010/0009124 | A1 | 1/2010 | Robins | |
| 2010/0243152 | A1 | 9/2010 | Helfrich et al. | |
| 2011/0084428 | A1 | 4/2011 | Wade | |
| 2011/0132523 | A1 | 6/2011 | Evens et al. | |
| 2012/0034416 | A1 | 2/2012 | Lutz | |
| 2012/0097323 | A1 | 4/2012 | Nitsch | |
| 2012/0315455 | A1 | 12/2012 | Yamasaki | |
| 2013/0115429 | A1 | 5/2013 | Valle | |
| 2013/0328243 | A1 | 12/2013 | Hino et al. | |
| 2014/0027957 | A1 | 1/2014 | Blot et al. | |
| 2015/0165744 | A1 | 6/2015 | Guittard et al. | |

FOREIGN PATENT DOCUMENTS

| | | |
|---|---|---|
| DE | 10 2007 026099 | 12/2008 |
| EP | 1 216 816 | 6/2002 |
| EP | 1216816 A1 | 6/2002 |
| FR | 2440831 | 6/1980 |
| FR | 2 673 571 | 9/1992 |
| FR | 2 929 165 | 10/2009 |
| FR | 2942165 | 8/2010 |
| WO | WO-2012/007780 | 1/2012 |
| WO | WO 2012/114933 | 8/2012 |

OTHER PUBLICATIONS

French Search Report for Application No. FR 1257256 dated Apr. 15, 2013.
French Search Report for Application No. FR 1162499 dated Jul. 17, 2012.
Non-Final Office Action for U.S. Appl. No. 13/724,475 dated Jun. 20, 2014.
French Search Report for Application No. 12 54 925 dated Mar. 5, 2013.
International Search Report for Application No. PCT/FR2013/051159 dated Sep. 11, 2013.
Final Office Action for U.S. Appl. No. 13/724,475 dated Dec. 26, 2013.
Restriction Requirement for U.S. Appl. No. 13/949,981 dated Feb. 5, 2015.
Non-Final Office Action for U.S. Appl. No. 13/949,981 dated Jun. 12, 2015.
Buisson G et al: "Le Preformage, Un Passage Oblige", Revue Generale Des Caoutchoucs Et Plastiques, 461969 1, vol. 71, No. 735, Oct. 1, 1994, pp. 53-56, XP000444728.
French Search Report for Application No. FR 1262466 dated Sep. 4, 2013.
Final Office Action for U.S. Appl. No. 13/949,981 dated Nov. 18, 2015.
Non-Final Office Action for U.S. Appl. No. 13/724,475 dated Dec. 21, 2015.
Advisory Action for U.S. Appl. No. 13/949,981 dated Feb. 11, 2016.
Restriction Requirement for U.S. Appl. No. 14/557,074 dated Jul. 1, 2016.
Non-Final Office Action for U.S. Appl. No. 13/949,981 dated Jul. 1, 2016.

* cited by examiner

PROCESS FOR MANUFACTURING A TEXTILE PREFORM WITH CONTINUOUS FIBRES BY CIRCULATION OF HOT GAS FLOW THROUGH A FIBROUS ARRAY

TECHNICAL FIELD

The present invention relates to the field of the manufacture of a textile preform from a fibrous array comprising continuous fibres. Such a preform is an intermediate product having a geometry identical or similar to that of the desired final part, and normally having a sufficient stiffness to be handled while conserving its shape.

The invention applies more particularly to the fields of aeronautics and automobiles and, more generally, to the field of transport requiring parts made of composite material based on fibres and resin.

BACKGROUND

The manufacture of a textile preform with continuous fibres normally takes place from a resin powdered fibrous array, in the form of initially flat woven sheet(s), an assembly that is stamped between a punch and a matrix in order to model it to the desired geometry. To do so, the punch is generally activated by a translation movement intended to bring it into contact with the fibrous array, then to deform this assembly until it is pressed tightly against the matrix, marking the end of the stamping.

Then, the tooling clasping the fibrous array is placed in an oven in order to assure the melting and the hardening of the resin powder, which then links the fibres together. Cooling is then carried out, then the textile preform obtained is extracted from the tooling, in order to undergo subsequent operations making it possible to obtain the final part made of composite material. An alternative embodiment consists in placing heating elements directly in the tooling, to replace the step of heating in the oven.

Nevertheless, whatever the solution retained, this type of process remains to be optimised in terms of manufacturing time, this being strongly impacted by the length of the temperature raising and lowering phases.

SUMMARY

The aim of the invention is thus to overcome, at least partially, the aforementioned drawbacks relative to the embodiments of the prior art.

To do so, the subject matter of the invention is firstly a process for manufacturing a textile preform by stamping of a fibrous array comprising continuous fibres, the process comprising a step for heating of the fibrous array between a matrix and a punch to stiffen said fibrous array. According to the invention, the step for heating is performed by having a hot gas flow circulate through the matrix, the fibrous array and the punch. In addition, the fibrous array comprises a stack of fibrous layers with continuous fibres, preferably coated with resin powder. Moreover, a sliding layer is interposed between two directly consecutive fibrous layers, the sliding layer having a coefficient of friction less than that of the fibrous layers, and each sliding layer has a hollowing out for the passage of the punch during a punching step aiming to press the fibrous array against said matrix. In other words, it ensures that the friction forces between a sliding layer and a fibrous layer are less than the friction forces between two fibrous layers.

The invention is remarkable in that it breaks with the conventional techniques used for heating the stamped fibrous array, since it is here provided to heat this assembly by means of a hot gas flow passing through the tooling as well as the fibrous array to be stiffened. The use of this technique by forced convection considerably cuts down the manufacturing time of the textile preform.

The process according to the invention preferably provides for at least one of any of the following additional technical characteristics, taken in isolation or in combination.

The process comprises, after the step for heating, a step for cooling the fibrous array performed by having a flow of cooling gas circulate through the matrix, the fibrous array and the punch.

For the hot gas, it is preferably air, taken to a desired temperature and pressure depending on the needs encountered. Preferably, the injection of gas takes place under pressure, for the heating and/or the cooling.

Each sliding layer is maintained fixedly with respect to the matrix during the punching step.

The invention also relates to a process for manufacturing a part comprising the implementation of a process for manufacturing a textile preform as described above, followed by a step of resin impregnation of the textile preform obtained.

Preferably, said step of impregnation is performed by the resin transfer moulding (RTM) technique or the liquid resin infusion (LRI) technique. Whatever the case, the impregnated resin is hardened to obtain the final part made of composite material.

The invention also relates to tooling for the implementation of a process for manufacturing a textile preform as described above, said tooling comprising a matrix and a punch each having a multiperforated portion for maintaining the fibrous array. The multiperforated portions enable the passage of the flow of gas, which is also intended to pass through the fibrous array.

The tooling according to the invention preferably comprises at least any one of the following additional technical characteristics, taken in isolation or in combination.

The tooling comprises a gas flow funnel, the flared end of which is intended to supply with gas, in a homogenous manner, the perforations of the multiperforated portion of the matrix.

The multiperforated portion of the matrix is entirely housed inside the flared end of the funnel.

The tooling comprises a frame supporting the matrix and inside of which is placed the gas flow funnel, preferably made of silicone.

The punch has a cavity in part defined by the multiperforated portion of the punch, this cavity being also defined by a wall equipped with a gas outlet.

The tooling comprises means of circulating the gas, means of heating the gas, and means of regulating the means of heating the gas.

Finally, the tooling comprises, interposed between two directly consecutive fibrous layers of the fibrous array from which the textile preform is intended to be obtained, a sliding layer having a coefficient of friction less than that of the two fibrous layers, each sliding layer having a hollowing out for the passage of the punch. Preferably, such a sliding layer is interposed between all of the fibrous layers of the fibrous array.

Other advantages and characteristics of the invention will become clear in the non-limiting detailed description given below.

BRIEF DESCRIPTION OF DRAWINGS

This description will be made with reference to the appended figures, among which.

DETAILED DESCRIPTION

Figure 1:
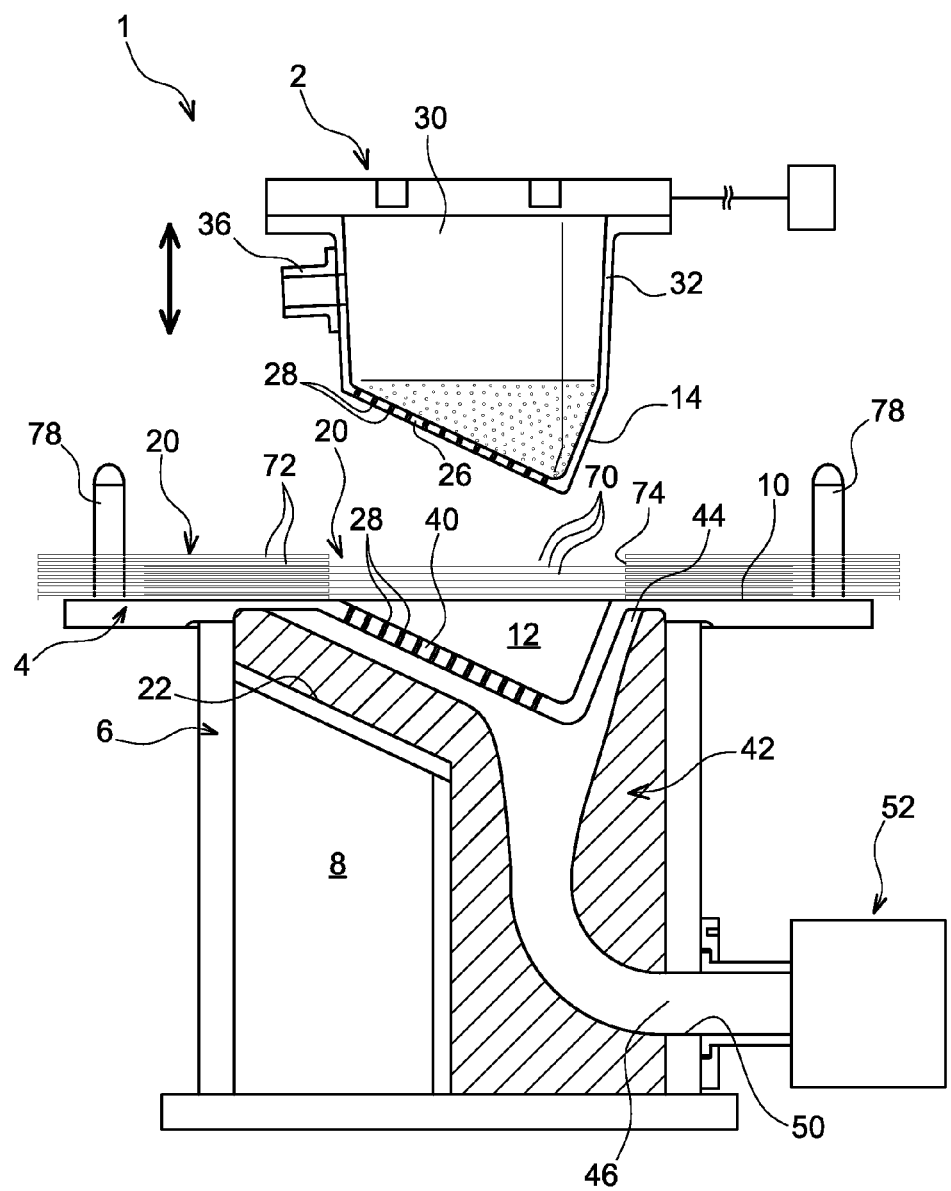
FIG. 1 represents a sectional view of a tooling for the manufacture of a textile preform, according to a preferred embodiment of the invention.

With reference firstly to FIG. 1, a tooling 1 is represented for the manufacture, by stamping, of a textile preform comprising continuous fibres, according to a preferred embodiment of the present invention.

Overall, the tooling has two separate parts, a first part designated moveable and comprising essentially a punch 2, and a second part designated fixed, comprising a matrix 4 as well as a frame 6. Concerning this fixed part, the matrix 4 is taken to the upper end of the frame 6, which defines a hollow 8 closed off towards the top by the matrix 4. The frame 6 is for example made of cast iron, by sand moulding perfectly suited to obtaining a hollow element.

The matrix 4 defines a flat surface 10 at the centre of which is provided an impression 12 of shape corresponding to that of the desired textile preform. This impression 12 also has a complementary shape to that of the lower end 14 of the punch 2, the preform being intended to be shaped between these two elements. In the example represented in the figures, the impression 12 and the lower end 14 of the punch, which form respectively a mould and a counter mould, each have a section of triangular shape. Nevertheless, any other shape may be envisaged for the textile preform, without going beyond the scope of the invention.

The textile preform is intended to be obtained from a fibrous array 20, which is here formed of a stack of fibrous layers coated with resin powder. Each fibrous layer comprises, preferably exclusively, continuous fibres, in the conventional sense adopted in the field of composite materials.

These fibres may be, depending on the desired use, either woven, or presented in the form of multiaxial complexes. A multiaxial complex is constituted of several sheets of fibres each having a single orientation, said sheets being laid out according to multiple orientations contributing to the resistance isotropy of the assembly. The cohesion of the different sheets is obtained by topstitches passing through the assembly of layers.

Before stamping, the assembly 20 is of substantially parallelepiped or flat shape, depending on its thickness. It is placed on the flat surface 10 of the matrix, and thus covers the impression 12 thereof before the implementation of the step of punching/stamping which will be described hereafter.

Figure 2:
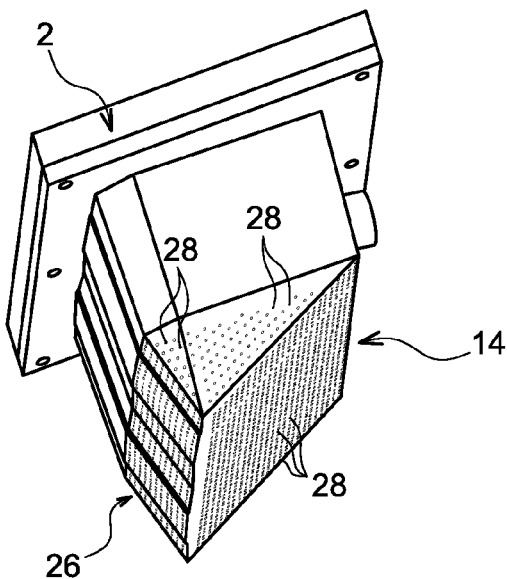
FIG. 2 represents a perspective view of the punch forming an integral part of the tooling shown in FIG. 1.

As may be seen in FIGS. 1 and 2, the lower end 14 of the punch 2 has a portion 26 merging with the end 14, and intended to clasp/maintain the fibrous array. This portion 26 is multiperforated, namely that it has a plurality of perforations 28 intended for the passage of a flow of gas. Each perforation 28 preferably has a diameter comprised between 2 and 4 mm, and the density of these perforations, at the level of the portion 28, is comprised for example between 2 and 10 perforations/cm$^2$, and even more preferentially of the order of 3 to 4 perforations/cm$^2$. Preferably, these perforations are uniquely formed in the flat zones of the portion 26, and not in the rounded portions and the edges between these flat zones, with the aim of obtaining the most satisfactory possible quality for the textile preform. In addition, these perforations are preferably formed on all of the zones in contact with the preform.

The punch 2 also takes the form of a hollow part defining internally a cavity 30 defined by the multiperforated portion 26, cavity in which thus open out the perforations 28. The cavity 30 is also defined by a lateral wall 32 of the punch, which is equipped with a gas outlet 36 intended for the evacuation of the flow of gas injected upstream in the tooling, during the process of manufacture as will be described hereafter. In other words, the punch comprises two parts, the first 26 intended to be in contact with the preform, and the second, higher, enabling the evacuation of the gaseous flow.

In an analogous manner to that which has been described, in the matrix 4, the portion 40 that defines the impression 12 and which is intended to maintain/clasp the fibrous array during the punching step, also has a multiperforation. It thus integrates perforations 28 identical or similar to those described above, in terms of diameter and/or density. The multiperforated portions of the matrix and the punch are thus opposite each other and, preferably, the perforations are situated in the alignment of each other, two by two.

Figure 3:
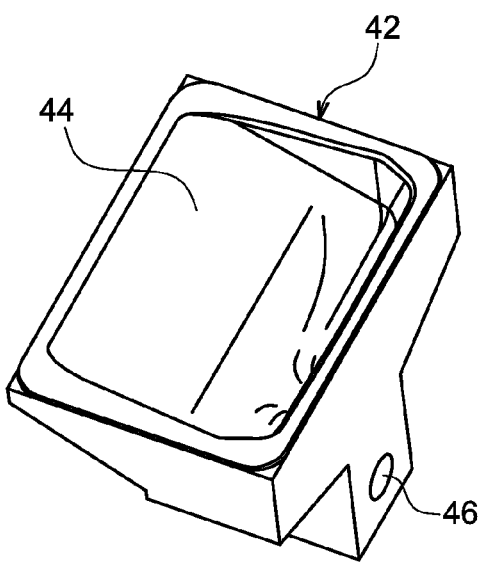
FIG. 3 represents a perspective view of the air funnel forming an integral part of the tooling shown in FIG. 1.

With reference to FIGS. 1 and 3, the inner space 8 of the frame 6 has a housing 22 provided to accommodate a gas flow funnel 42 having a flared end 44 oriented upwards, and a contracted end 46 oriented downwards.

More precisely, the flared end 44 receives entirely the multiperforated portion 40 of the matrix 4. In addition, this end 44 has a shape complementary to that of the portion 40 of the matrix, these two shapes being preferably homothetic. In this way, the flow of air circulating through this funnel makes it possible to supply in a homogenous manner all of the perforations 28 of the portion 40 of the matrix 4, with an air circulation space of substantially constant thickness between the surface of the flared end 44, and the outer surface of the multiperforated portion 40. Homogenous supply of gas is here taken to mean that during the step for heating, the flow rate of gas passing through each perforation 28 of the multiperforated portion 40 is identical or substantially identical. The same is true for the cooling step.

This thus ensures that the totality of the part of the matrix 4, which forms the impression 12, is housed inside the flared end 44 of the funnel 42. This funnel is preferentially made of silicone in order to withstand high temperature conditions, likely to be encountered during the implementation of the process of manufacturing the textile preform.

The contracted end 46 of the funnel opens out into a through orifice 50 of the frame, which is connected to a device 52 represented only schematically in FIG. 1, and intended to circulate and to heat the air.

Figure 4:
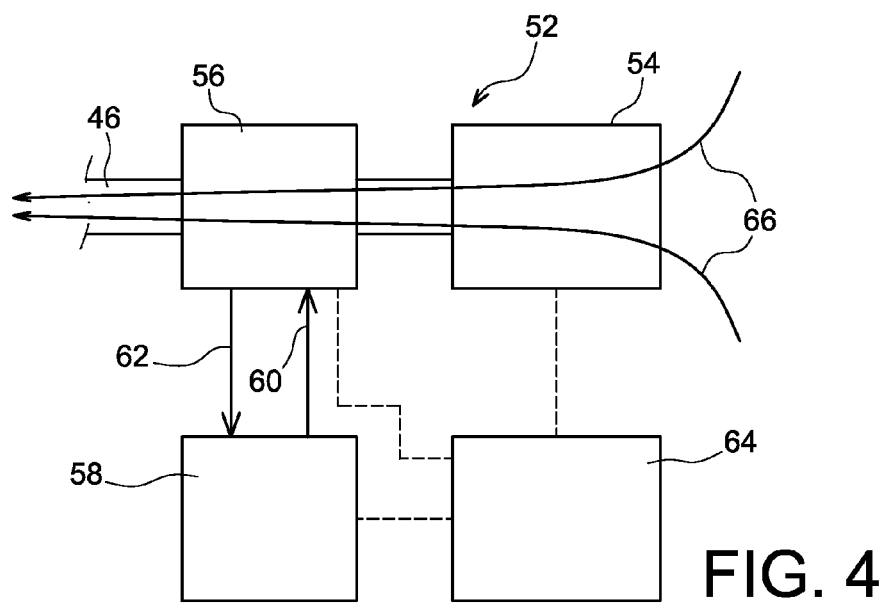
FIG. 4 is a schematic view representing the means making it possible to circulate and heat the air.

This device 52 is shown in greater detail in FIG. 4. It firstly comprises means of circulating air, said means 54 preferably taking the form of an air blower, which can be assimilated to a pump. This makes it possible in fact to drawn in external air and to introduce it into means 56 enabling the heating of the air, said means 56 taking any form considered appropriate by those skilled in the art, such as a conventional air heater. The latter is coupled to a regulator 58 which, via an electronic interface 60, makes it possible to control the power of the air heater 56. Furthermore, thermocouple type means 62 integrated in the air heater make it possible to deliver to the regulator 58 information items concerning the temperature within said air heater.

Moreover, an electrical power supply 64 makes it possible to supply each of the means 54, 56, 58. Thus, as is shown by the arrows 66 of FIG. 4, the ambient air drawn in by the blower 54 transits therein before being introduced into the air heater 56, where the air is heated before being introduced into the contracted end 46 of the funnel 42.

Figure 5:
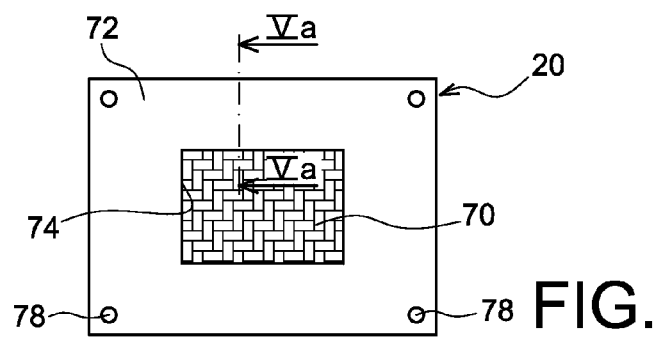
FIG. 5 represents a top view of the fibrous array from which is obtained the textile preform.
Figure 5A:
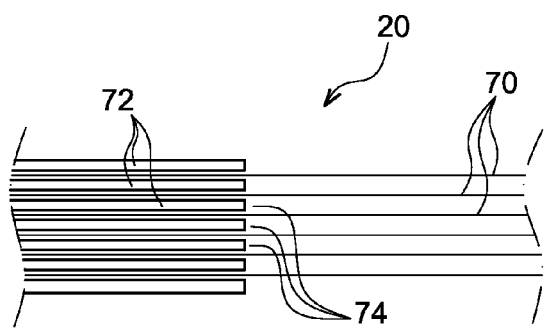
FIG. 5a is a sectional view taken along the line Va-Va of FIG. 5.

With reference now to FIGS. 1, 5 and 5a, it is noted that the fibrous array 20 has a plurality of flat layers of fabric 70 superimposed on each other. They are preferentially, but not exclusively, layers of continuous carbon fibres. In the embodiment represented, between the directly consecutive layers of fabric 70 is placed a sliding layer 72 made of a material different to that of the layers 70. It may be, for example, metal or PVC layers and, more generally, layers in which the coefficient of friction is less than that of the layers of fabric 70. The presence of these sliding layers advantageously brings about a reduction in the surfaces of fabric directly in contact with each other, and considerably reduces defects likely to be observed due to friction between these layers during the step of punching/stamping. In fact, during this step, it has been noted that the reinforcement of a layer of fabric means that each part of strand at the surface of this layer is a point for catching on the neighbouring layers of fabric. This is likely to lead to defects such as folds and creases at the surface of the textile preform obtained, buckling at the surface of this preform, or instead deformations of the stitches at the surface of the preform, these deformations taking the form of undulations of strands.

The putting in place of the sliding layers thus provides a very satisfactory response to the potential problem of friction between the different layers of the stack during stamping, leading to a relative displacement between these fibrous layers. They thus favour the sliding and thus the forming of the layers of fabric during their movement resulting from the stamping. They can be inserted before the placement of the layers on the tooling, or instead at the moment of the shaping of the fibrous array on the tooling.

In order not to hinder the punching operation, each sliding layer, which forms an integral part of the tooling, has a central hollowing out 74 for the passage of the punch during the subsequent step of stamping. Preferably, the hollowing out 74 has, in top view, a contour substantially merged with that of the impression 12 of the matrix 4.

A process for manufacturing a textile preform according to a preferred embodiment of the invention will now be described, said process being implemented by means of the tooling 1 described above.

Firstly, it is noted that the fibrous array 20 is placed on the upper surface of the matrix 4 with the punch 2 in upper position with respect to the fixed frame 6, as is shown in FIG. 1.

This assembly 20, having a general parallelepiped or flat shape before its stamping, thus integrates the sliding layers 72 which are maintained fixed with respect to the matrix, for example by means of pins 78 situated at the ends of this matrix, and passing through corresponding orifices of the sliding layers 72. It is here preferentially ensured that these pins 78 do not pass through the layers of fabric 70 intended to obtain the textile preform, said pins being laid out externally with respect to the layers 70. In fact, the layers of fabric 70 are preferably shorter than the sliding layers 72, the latter having to be maintained by the pins whereas the layers of fabric 70 are left free to be able to be formed in a satisfactory manner.

In addition, it is noted that the presence of the sliding layers 72 participates in maintaining in position the layers of fabric 70 on the matrix during the stamping step and enables the elimination of tightening means normally retained to maintain these layers. In fact, the own weight of these sliding layers, especially when they take the form of metal plates, inhibits the swelling of the layers of fabric 70.

In this state of FIG. 1, the layers of fabric 72 are coated with a resin powder, in a manner known to those skilled in the art. In this respect, it is indicated that the quantity of resin constituted by this powder normally represents less than 5% of the total quantity required to obtain the final part made of composite material.

Figure 6:
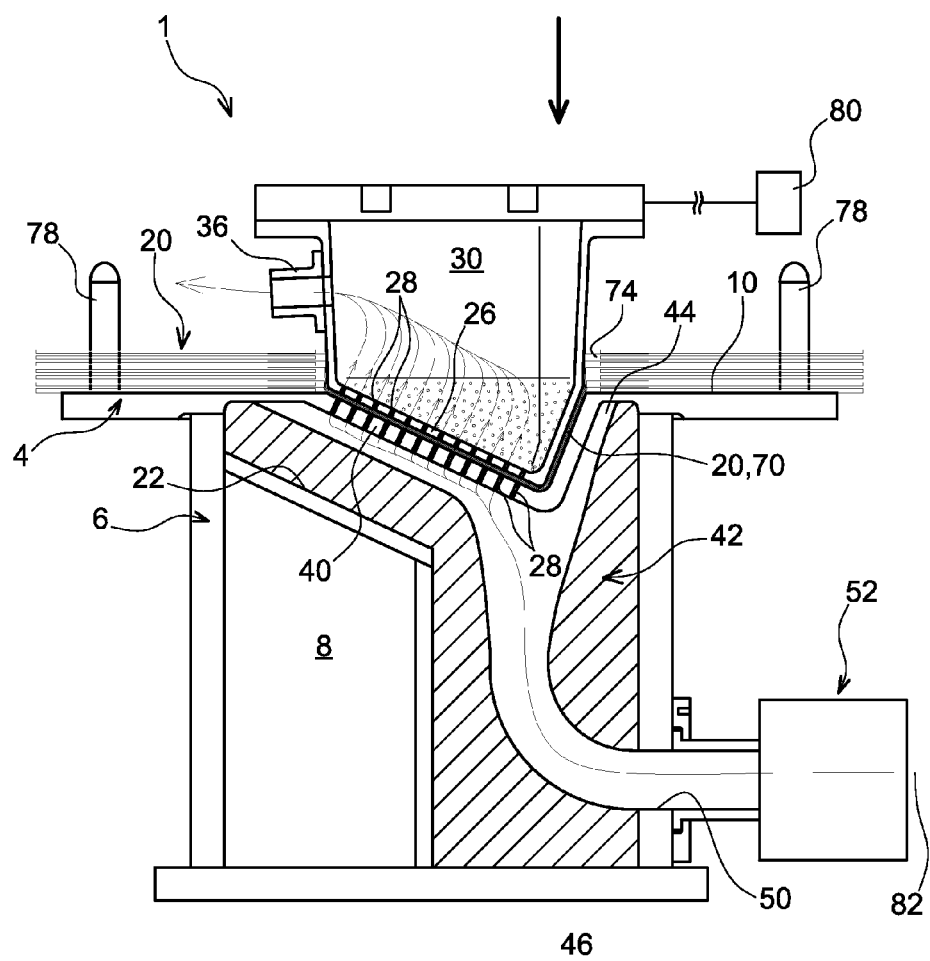
FIGS. 6 and 7 represent different steps of a process for manufacturing a textile preform according to a preferred embodiment of the invention, the process being implemented by means of the tooling shown in the preceding figures.

Referring now to FIG. 6, a first step is shown of stamping/punching thus aiming to lower the punch, by a translation movement downwards performed by using conventional means of placing in movement 80. During this step, the lower end 14 of the punch enters into contact with the assembly of layers 70 perpendicular to the impression 12, in which said assembly of layers is progressively deformed then pressed against the multiperforated portion 40 of this same matrix 4. At the end of this step, the punch 4 has passed through the hollowing outs 74 formed in the sliding layers 72 that have remained immobile, and the fibrous array 20 is deformed and maintained/clasped between the two multiperforated portions 40 and 26 of the tooling 1. Once this step is finished, the relative position between the punch 2 and the matrix 4 is maintained, then a step for heating of the stamped fibrous array is carried out so as to assure the melting then the hardening of the resin powder, so as to link the fibres together. To do so, the aforementioned device 52 is implemented, so as to generate a hot gas flow transiting successively via the blower 54, the heater 56, the funnel 42, the multiperforated portion 40 of the matrix 4, the layers of the fibrous array 20, the multiperforated portion 26 of the punch, the cavity 30 of this same punch, and finally the air outlet 36 of this same punch. In transiting through the fibres, a forced convection is created which generates an extremely rapid increase in the temperature of the resin, this leading to a substantial reduction in time compared to that observed in the embodiments of the prior art. Then, once the resin powder is melted, a step of cooling the fibrous array is carried out, performed in a manner substantially analogous to that of the step for heating, but with a flow of cooling gas at a lower temperature, conditioned by the air heater, 56. Here again, the forced convection obtained by the circulation of this cold air flow leads to a considerable reduction in the cooling cycle time. As an indication, it has been observed that the implementation of these two successive steps of heating and cooling of the fibrous array could be carried out for a duration of several minutes only, whereas in the prior art, the process implementing a step for heating by oven, or by heating element integrated in the tooling, requires several hours of treatment. In FIG. 6, the step for heating and the step for cooling are both shown schematically by the arrows 82 showing a circulation of air flows through the tooling, and particularly a homogenous distribution of said flow through the multiperforated portion 40 integrally housed in the flared end 44 of the funnel 42. In addition, it is noted that the passage of the flow of gas takes place preferably under pressure, for example at a pressure comprised between 1 and 8 bars. The temperature of the hot gas flow is for example comprised between 50 and 200° C., whereas this temperature is for example lowered to ambient temperature during cooling.

Figure 7:
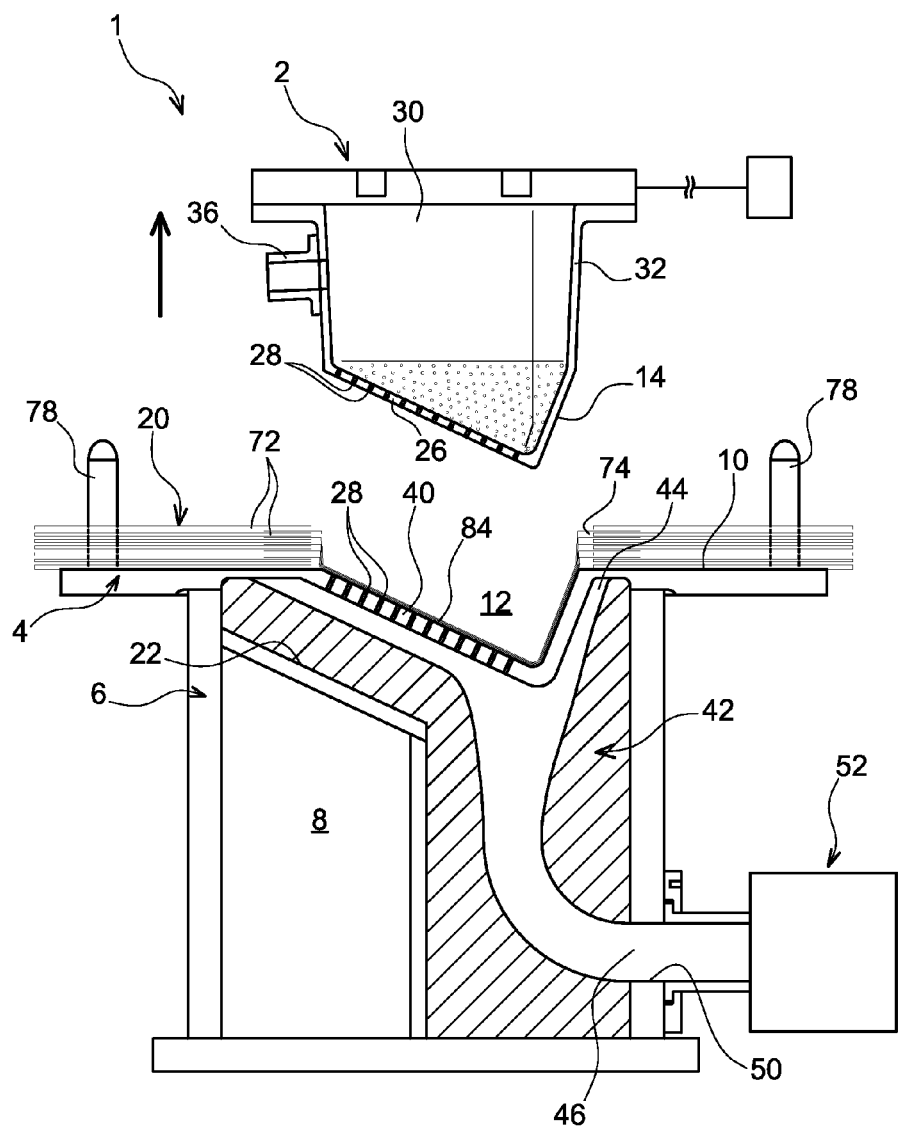

Once this textile preform 84 is obtained, and the cooling finished, the punch 2 is again displaced so as to extract it from the impression 14, enabling the removal of this preform 84 pressed against the matrix 4, as may be seen in FIG. 7.

When the textile preform is removed from the matrix 4, this has a sufficient stiffness to be able to be handled without being deformed. Nevertheless, the element obtained is an intermediate product, which then has to undergo a conventional step of resin impregnation, then hardening thereof. This is carried out preferably by the RTM (Resin Transfer Moulding) technique, or instead by means of the LRI (Liquid Resin Infusion) technique. In all cases, the textile preform 84 is impregnated with a quantity of resin considerably greater than that of the resin powder cited previously, since this new impregnation corresponds to around 95% of the totality of the resin employed from one end to the other of the manufacturing cycle, in other words between the preparation of the fibrous array 20, and the obtaining of the final part made of composite material. In this respect, it is indicated that the shape of the final part obtained is identical or substantially analogous to that of the preform 84 shown in FIG. 7.

Obviously, various modifications may be made by those skilled in the art to the invention that has been described, uniquely by way of non-limiting examples.

The invention claimed is:

1. A process for manufacturing a textile preform by stamping of a fibrous array comprising continuous fibers, the process comprising:
   providing a matrix and a punch,
   forming the fibrous array by pressing the punch against the matrix, with a stack of fibrous layers comprising continuous fibers being located therebetween, the continuous fibers comprising a resin, and
   circulating a hot gas flow through the matrix, the fibrous array, and the punch to heat and stiffen the fibrous array,
   wherein a sliding layer is interposed between two directly consecutive fibrous layers, the sliding layer having a coefficient of friction less than that of the fibrous layers and
   wherein each sliding layer comprises a hollowing out for the passage of the punch during the step of pressing the punch against the fibrous array and the matrix.

2. The process of claim 1, further comprising cooling the fibrous array by circulating a flow of cooling gas through the matrix, the fibrous array, and the punch after circulating the hot gas flow.

3. The process of claim 1, wherein each sliding layer is maintained fixedly with respect to the matrix while the punch is pressed against the fibrous array and the matrix.

4. The process of claim 1, wherein the resin comprises a coating of resin powder on the continuous fibers.

5. A process for manufacturing a part, the process comprising:
   providing a textile preform by:
      providing a matrix and a punch,
      forming the fibrous array by pressing the punch against the matrix, with a stack of fibrous layers comprising continuous fibers being located therebetween, the continuous fibers comprising a resin, and
      circulating a hot gas flow through the matrix, the fibrous array, and the punch to heat and stiffen the fibrous array,
      wherein a sliding layer is interposed between two directly consecutive fibrous layers, the sliding layer having a coefficient of friction less than that of the fibrous layers, and
      wherein each sliding layer comprises a hollowing out for the passage of the punch during the step of pressing the punch against the fibrous array and the matrix, and
   impregnating the textile preform with resin.

6. The process of claim 5, wherein impregnating the textile preform with resin comprises a resin transfer molding or a liquid resin infusion technique.

* * * * *